Nov. 30, 1937. J. G. SWAIN ET AL 2,100,654
WHEEL AND RIM MOUNTING
Filed Jan. 24, 1936
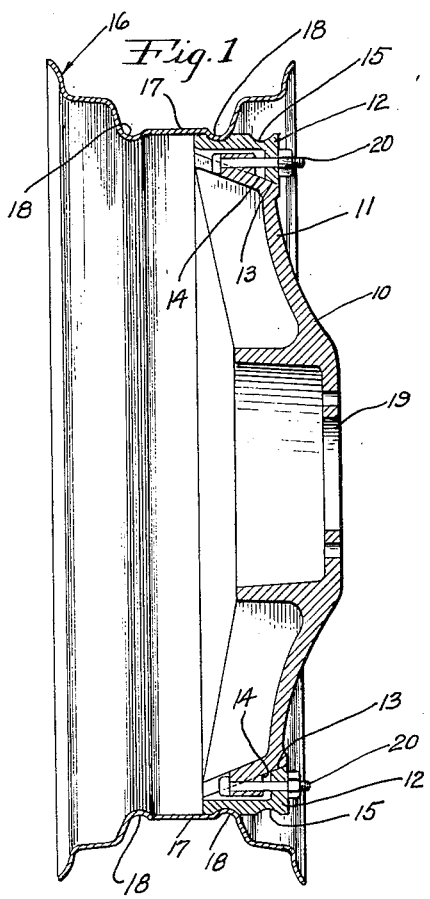
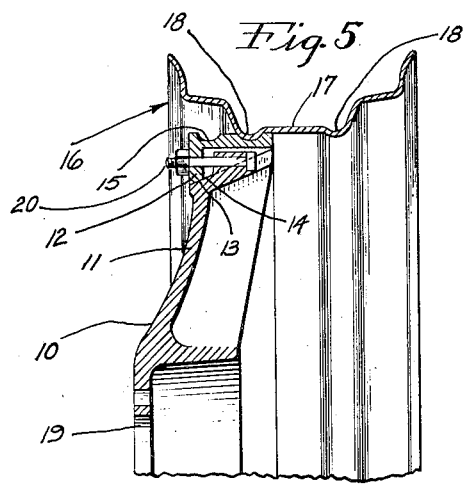
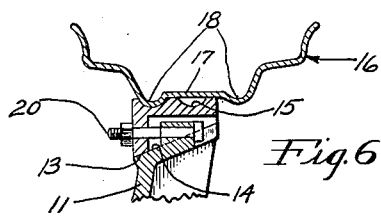
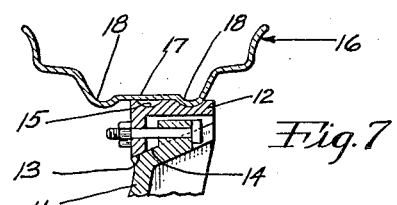
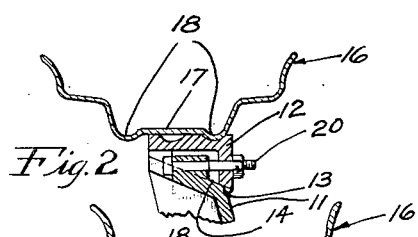
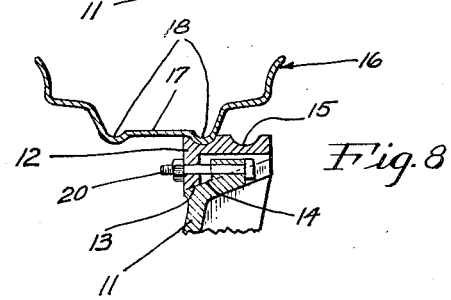
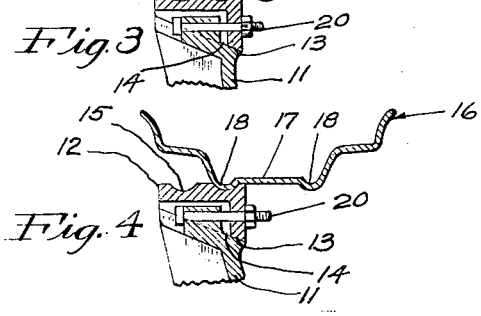
Inventor
Joseph G. Swain and
Alva W. Woodward
Attorney Patented Nov. 30, 1937

2,100,654

UNITED STATES PATENT OFFICE 2,100,654

WHEEL AND RIM MOUNTING

Joseph G. Swain, Akron, and Alva W. Woodward, Kent, Ohio, assignors to Wingfoot Corporation, Wilmington, Del., a corporation of Delaware Application January 24, 1936, Serial No. 60,598

6 Claims. (Cl. 301—12)

The present invention relates to wheel and rim mountings and particularly of the type used for tractors and other farm implements, and a particular object of this invention is to provide a wheel and rim structure which permits one to obtain a number of tread widths for the implement upon which the same is to be used, whereby the implement may be used for cultivating different crops which are planted at varying intervals between the rows. Thus, the implement can be used without running the wheels over the crops, which might otherwise occur if the implement had wheels with fixed mountings for the same and the wheels in turn had the rims fixed in but one position thereon.

It is realized that the feature of having a farm implement with provision for various tread widths is not new but it is believed that the present invention discloses a combination which is not shown in the prior art, the points of novelty in which will be pointed out hereinafter.

Another object of this invention is to provide a simple, reversible wheel and a rim mounting which is of novel construction.

Another object of this invention is to provide a rim having peripheral ridges or grooves interiorly thereof adapted to cooperate with a clamping lug on the periphery of a wheel in such a way that by selectively arranging different grooves or notches in different notches or grooves, respectively, on the lugs surrounding the periphery of the wheel the rim may be positioned at various positions axially of the wheel.

Another object of this invention is to provide a wheel with lugs spaced about the periphery thereof and offset axially from the portion of the wheel which is to be attached to the axle in order that reversal of the wheel on the axle will position the lugs in a different axial position than previously. This is to be used in combination with a rim having means adapted to cooperate with the lugs in such a manner as to permit relative axial spacing of the rim with the wheel in either of its two positions above mentioned.

Another object of this invention is to provide a rim which is preferably of the drop-center type having ridges or grooves formed in the bottom of the channel thereof and arranged substantially centrally of the rim width for the purposes to be described hereinafter.

Other objects of this invention will appear hereinafter as the description thereof proceeds, the novel features, arrangements and combinations being clearly set forth in the specification and in the claims thereunto appended.

In the drawing:

Fig. 1 is a vertical cross-section of a wheel embodying my invention with a rim applied thereto, the latter also being shown in cross-section.

Figs. 2, 3, and 4 are fragmentary views similar to Fig. 1, showing the other positions of the rim relative to the wheel when the wheel is arranged as shown in Fig. 1 and without changing the position of the wheel on the axle; and Figs. 5, 6, 7, and 8 show the relative positions of the wheel and rim when the wheel is in the reverse position on the axle as illustrated in Fig. 5.

In the drawing, the reference numeral 10 represents a wheel having a web 11 or if desired it may be provided with spokes instead of a web. Mounted peripherally of the wheel are a series of lugs 12, each of which has a tapered seat 13 on the bottom side thereof adapted to cooperate with a correspondingly tapered seat on the wheel 10. The periphery of each lug is provided with a plurality of grooves 15.

A drop-center rim is illustrated in the present invention at 16 and has the central channel 17, in the bottom of which are rolled the grooves 18. This is done during the forming operation, thus it will be noted that two downwardly extending ribs are provided on the interior of the rim and these are selectively engageable within the grooves 15. The various positions of the rim are illustrated in Figs. 1, 2, 3, and 4. Considering that the farm implement to which this wheel is applied is at the right of Fig. 1, it will be seen that the various positions of the rim shown in Figs. 2, 3, and 4 are such as to bring the rim successively into positions closer to the implement body or inwardly of the outer ends of the axle (not shown).

In Figs. 5 to 8 inclusive, we have illustrated a wheel in the reverse position to that illustrated in Fig. 1 and, again considering that the farm implement is at the right of Fig. 5, it will be noted that the various positions of the rim in Figs. 5 to 8 inclusive are successively closer to the farm implement in the following order: Fig. 8, Fig. 7, Fig. 6, and Fig. 5. All of these positions of the rim are closer to the vehicle than those illustrated in Figs. 1 to 4 inclusive, due to the fact that the wheel 10 has the lugs 12 thereof arranged in axially offset relation to the web 19 which is attached to a flange on the axle. This flange on the axle can take any desired form but is preferably fixed with relation to the axle itself. Thus, it is possible, by merely loosening the bolts 20 which hold the lugs 12 in place, to release the rim and shift the same axially to secure any of the four desired positions of the rim possible with the wheel in either position on the axle, the other four positions being obtained by reversing the wheel on the axle as previously described.

By rolling the grooves to form the ridges on the inner periphery of the rim the rim is much more readily and cheaply constructed than where a rib is formed separately on the rim itself as the same can be rolled into the rim during the general process of rolling the rim into shape. Also these ridges do not affect the functioning of the rim as the inner tube which normally seats itself within the channel 11 on this type of wheel, conforms readily to these grooves 18.

In the embodiment of the invention shown in the drawing it will be noted that there are provided eight different positions for the rim axially of the axle of the farm implement and of course more or less positions could be provided if desired, but it has been found that eight different tread widths will normally satisfy all of the requirements necessary for implements of this nature. The arrangement shown is such that the rim in no instance is supported at too great a distance from the point of support for the wheel itself.

Obviously, those skilled in the art to which this invention pertains may make various changes in the particular arrangement or construction of the parts shown in the drawing without departing from the spirit of this invention and, therefore, we do not wish to be limited in said invention except as hereinafter set forth in the claims hereunto appended.

Having thus fully described our invention, what we claim and desire to secure by Letters Patent of the United States is:—

1. A wheel and rim assembly comprising a wheel having a portion adapted to be attached to an axle at a given position on said axle, a rim support arranged peripherally of said wheel, a rim on said rim support, cooperating interlocking means on said rim and support to prevent axial movement of said rim relative to said wheel, said interlocking means being spaced axially from that portion of said wheel which is to be attached to said axle at the said position thereon, whereby upon reversal of the position of said wheel on said axle said rim will occupy a different axial position relative to said axle than when said wheel was in its first-mentioned position, and additional interlocking means for adjustably interlocking said rim with said wheel at different spaced axial positions with respect to each other.

2. A wheel and rim assembly comprising a wheel having a portion adapted to be attached to an axle at a given position on said axle, a rim support arranged peripherally of said wheel, a rim on said rim support, cooperating interlocking means on said rim and support to prevent axial movement of said rim relative to said wheel, said interlocking means being spaced axially from that portion of said wheel which is to be attached to said axle at the said position thereon, whereby upon reversal of the position of said wheel on said axle said rim will occupy different axial positions relative to said axle than when said wheel was in its first-mentioned position, and additional interlocking means for adjustably interlocking said rim with said wheel at different spaced axial positions with respect to each other, said additional interlocking means comprising means on said rim similar to the portion forming part of said cooperating means first mentioned and adapted to cooperate with the other portion of said cooperating means.

3. A wheel and rim assembly comprising a wheel having a portion adapted to be attached to an axle at a given position on said axle, a rim support arranged peripherally of said wheel, a rim on said rim support, cooperating interlocking means on said rim and support to prevent axial movement of said rim relative to said wheel, said interlocking means being spaced axially from that portion of said wheel which is attached to said axle at the said position thereon, whereby upon reversal of the position of said wheel on said axle said rim will occupy different axial positions relative to said axle than when said wheel was in its first-mentioned position, and additional interlocking means for adjustably interlocking said rim with said wheel at different spaced axial positions with respect to each other, said additional interlocking means comprising additional means on said rim support similar to the portion thereon forming part of said cooperating means first mentioned and adapted to cooperate with the other portion of said cooperating means.

4. A wheel and rim assembly comprising a wheel having a portion adapted to be attached to an axle at a given position on said axle, a rim support peripherally of said wheel, a rim on said rim support, cooperating interlocking means on said rim and support to prevent axial movement of said rim relative to said wheel, said interlocking means being spaced axially from that portion of said wheel which is to be attached to said axle at the said position thereon, whereby upon reversal of the position of said wheel on said axle said rim will occupy different axial positions relative to said axle than when said wheel was in its first-mentioned position, and additional interlocking means for adjustably interlocking said rim with said wheel at different spaced axial positions with respect to each other, said interlocking means comprising ridges and grooves and clamping means for holding said ridges in said grooves against displacement thereof.

5. A wheel and rim assembly comprising a wheel having a portion adapted to be attached to an axle at a given position on said axle, a rim support peripherally of said wheel, a rim on said rim support, cooperating interlocking means on said rim and support to prevent axial movement of said rim relative to said wheel, said interlocking means being spaced axially from that portion of said wheel which is to be attached to said axle at the said position thereon, whereby upon reversal of the position of said wheel on said axle said rim will occupy different axial positions relative to said axle than when said wheel was in its first-mentioned position, and additional interlocking means for adjustably interlocking said rim with said wheel at different spaced axial positions with respect to each other, said rim support having outward movement to hold the cooperating interlocking means in firm engagement with each other, and means for moving said lug outward.

6. A wheel and rim assembly comprising a wheel having a portion adapted to be attached to an axle at a given point on said axle, a rim support peripherally of said wheel, a rim on said rim support, a plurality of axially spaced grooves in the outer surface of each rim support, a plurality of axially spaced ridges on the inner surface of said rim, each adapted to be selectively arranged within different ones of said grooves, said grooves being spaced axially from the attaching portion of said wheel, whereby upon reversal of the position of said wheel on said axle said rim will occupy a different axial position relative to said axle than when said wheel was in its first-mentioned position, and additional interlocking means for adjustably interlocking said rim with said wheel at different spaced axial positions with respect to each other.

JOSEPH G. SWAIN.
ALVA W. WOODWARD.